United States Patent [19]
Suizu

[11] Patent Number: 5,384,491
[45] Date of Patent: Jan. 24, 1995

[54] MAIN SWITCH FEEDING A CONTROLLABLE ON/OFF SUB-SWITCH

[75] Inventor: Katsuto Suizu, Saitama, Japan

[73] Assignee: Kabushiki Kaisha Toshiba, Kawasaki, Japan

[21] Appl. No.: 36,848

[22] Filed: Mar. 25, 1993

[30] Foreign Application Priority Data

Mar. 26, 1992 [JP] Japan .................................. 4-068639

[51] Int. Cl.6 ............................................... H04N 5/63
[52] U.S. Cl. ..................................... 307/113; 307/140; 361/170

[58] Field of Search ............... 307/113, 119, 125, 126, 307/139, 140, 141.4, 141.8, 130, 131; 361/170

[56] References Cited

U.S. PATENT DOCUMENTS

5,229,654  7/1993  Shimizu ........................ 307/125

Primary Examiner—A. D. Pellinen
Assistant Examiner—Jonathan Kaplan
Attorney, Agent, or Firm—Cushman, Darby & Cushman

[57] ABSTRACT

A power source switch circuit can remember the last state a switch is in when main power is lost. A capacitor or battery is used to place the switch in its original position after the main power is restored.

7 Claims, 5 Drawing Sheets

MAIN SWITCH FEEDING A CONTROLLABLE ON/OFF SUB-SWITCH

BACKGROUND OF THE INVENTION

1. Field of the Invention

This invention relates to power source switch circuit and more particularly to a power source switch circuit wherein, in a television set or the like, when only a main switch for feeding a power source voltage to the entire set is operated, a sub-switch for feeding the power source voltage to the respective circuits will be able to be automatically switched on.

2. Description of the Related Art

Conventionally, in most television sets or the like, there are provided a switch (mentioned as a sub-switch hereinafter) for feeding an electric power to respective circuits within the set and a main switch for feeding an electric power from a commercial alternating current power source to the entire set.

In such television set or the like, while the main switch is engaged, the sub-switch will be able to be controlled by the operation of a remote control or the like so that the power source of the television circuit may be switched on/off.

Figure 3:
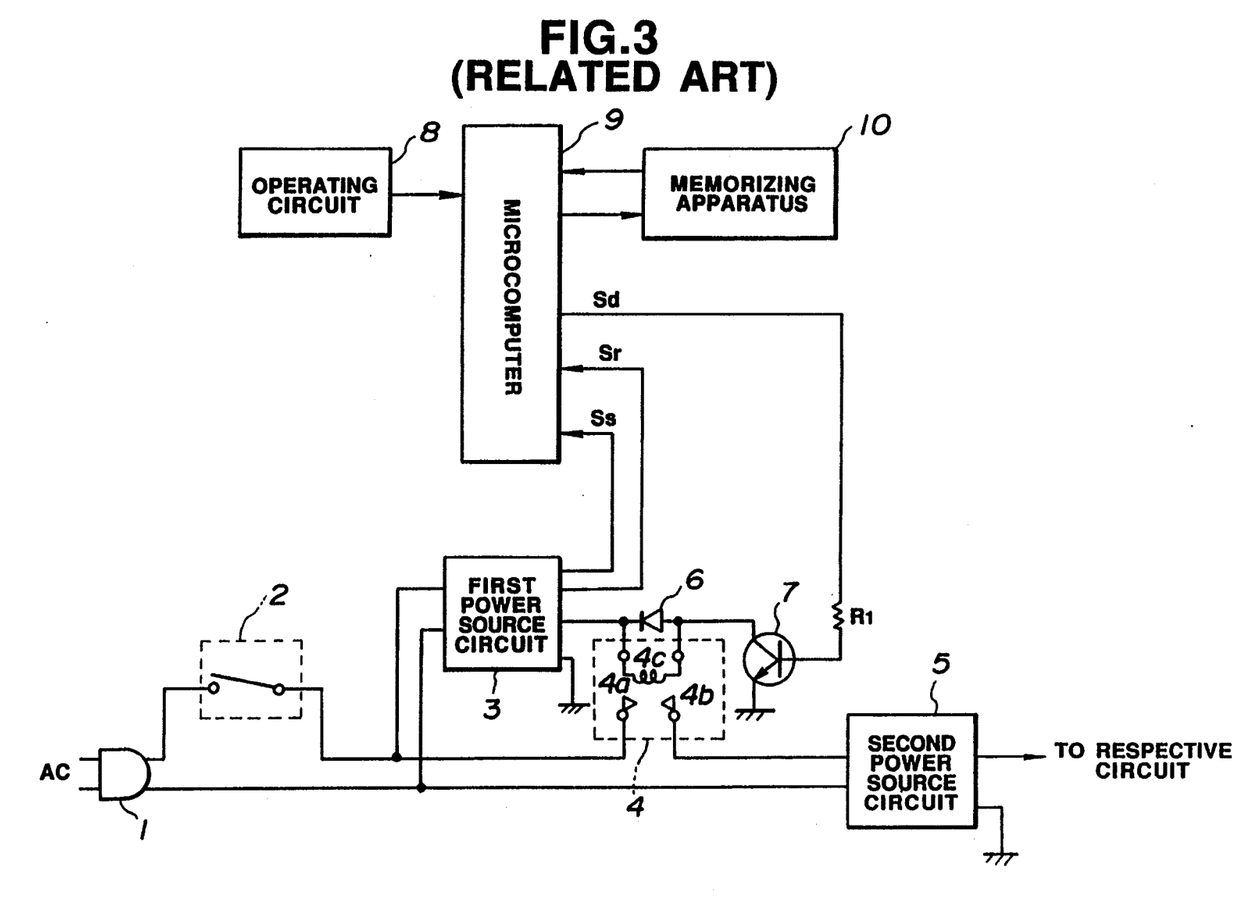
FIG. 3 is a block diagram showing a conventional power source switch circuit.

FIG. 3 is a block diagram showing a conventional power source switch circuit which is of an all-off type wherein, when a main switch 2 is switched off, all the power feeds will be eliminated.

A commercial alternating current power source (AC) not illustrated is fed to an AC plug 1. One input terminal of a first power source circuit 3 is connected to one power source line of the AC plug 1 through the main switch 2. Further, one input terminal of a second power source circuit 5 is connected to the above mentioned one power source line of the AC plug 1 through the main switch 2 and a sub-switch 4. The other input terminal of the first power source circuit 3 and the other input terminal of the second power source circuit 5 are connected to the other power source line of the AC plug 1. One output terminal of the second power source circuit 5 is connected to a television signal circuit not illustrated and the other output terminal is connected to a reference potential point.

There are three output terminals in the first power source circuit 3. The first output voltage is fed as a driving voltage Ss to a microcomputer 9, the second output voltage is fed as a resetting signal Sr to the microcomputer 9 and the third output voltage is fed to one end of a relay winding 4c of the sub-switch 4. The other end of the relay winding 4c is connected to a reference potential point through a collector-emitter path of a transistor 7. One end and the other end of the relay winding 4c are connected with each other through a surge absorbing diode 6. A relay controlling signal Sd from the microcomputer 9 is fed to the base of the transistor 7 through a resistance R1.

An operating circuit 8 for the user to switch on/off the power source of the television set with a remote control or the like or to operate the channel and a memorizing apparatus 10 provided with a non-volatile memory memorizing last channel positions, power source data or the like are connected to the microcomputer 9.

As described above, the present power source data of the sub-switch 4 are stored in the memorizing apparatus 10 so that, in case the main switch 2 is once switched off and is then again switched on, these power source data will be read out of the memorizing apparatus 10 by the microcomputer 9 to reproduce the last switching on/off of the sub-switch 4. That is to say, if the sub-switch 4 is on last, the microcomputer 9 will output an on-signal as a controlling signal Sd but, if the sub-switch 4 is off last, the microcomputer 9 will operate to output an off-signal as a controlling signal Sd.

Now, it shall be considered that the power source data stored in the memorizing apparatus 10 are stored as switched on and the main switch 2 is engaged.

When the main switch 2 is engaged, the first power source circuit 3 will be first switched on and the driving voltage Ss and resetting signal Sr will be fed to the microcomputer 9. The microcomputer 9 will be switched on by the driving voltage Ss and will be initially set by the resetting signal Sr and the initially set microcomputer 9 will read out the last power source data stored as switched on in the memorizing apparatus 10, will output a high level signal as a controlling signal Sd and will feed it to the base of the transistor 7 through the resistance R1 to switch on the transistor 7.

When the transistor 7 is switched on, an electric power will be fed to the relay winding 4c of the sub-switch 4 from the output terminal of the first power source circuit 3 and the relay winding 4c will be excited. The contacts 4a and 4b will contact with each other and, the commercial alternating current power source will be fed to the second power source circuit 5 and will be switched on. When the second power source circuit 5 is switched on, a predetermined electric power will be fed to the respective circuits of the television set not illustrated.

Now, it shall be considered that the power source data stored in the memorizing apparatus 10 are stored as switched off and the main switch 2 is engaged.

When the main switch 2 is engaged, the first power source circuit 3 will be first switched on and the driving voltage Ss and resetting signal Sr will be fed to the microcomputer 9. The microcomputer 9 will be switched on by the driving voltage Ss and will be initially set by the resetting signal Sr.

The initially set microcomputer 9 will read out the last power source data stored as switched off in the memorizing apparatus 10, will output a low level signal as a controlling signal Sd, will feed it to the base of the transistor 7 through the resistance R1 and the transistor 7 will not be switched on. As the transistor 7 is not switched on, the sub-switch 4 will remain off, the second power source circuit 5 will not be switched on and no electric power will be fed to the respective circuits of the television set.

However, as seen from the user side, there has been a problem that, though it is expected that, when the main switch 2 is engaged, the sub-switch 4 will be switched on, depending on the contents of the power source data stored in the memorizing apparatus 10, the television set will not operate to be switched on.

On the other hand, if the sub-switch 4 is controlled to be always switched on when the main switch 2 is engaged, the above mentioned problem will be solved. However, if it is thus controlled, in case the electricity is interrupted while the main switch 2 is engaged as it is (on stand-by), then the electricity is restored and the commercial alternating current power source is again fed to the first power source circuit 3, the sub-switch 4 will be freely switched on, though the stand-by should be restored, the electric power will be fed to the respective circuits of the television set and no favorable result will be made.

Figure 4:
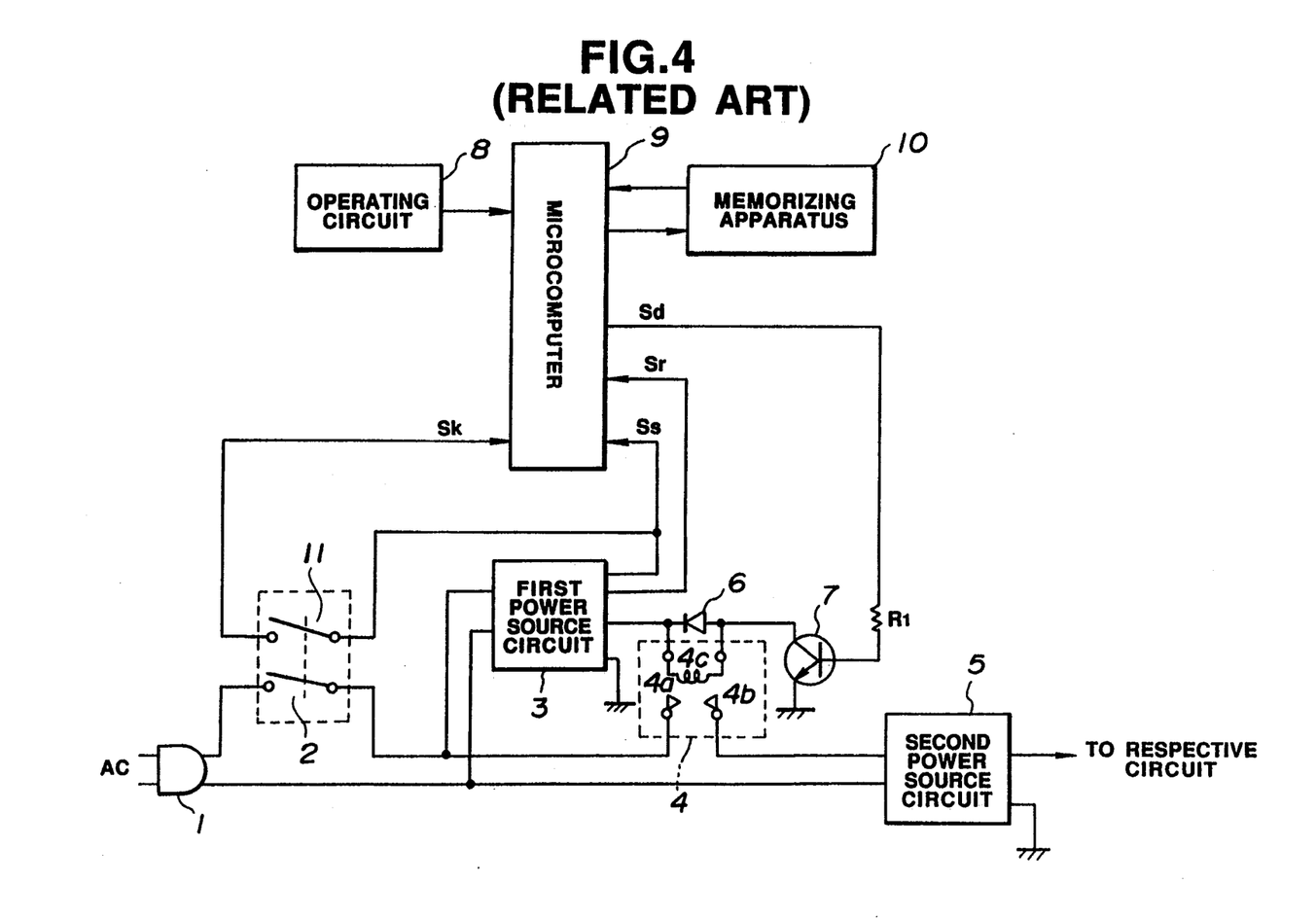
FIG. 4 is a block diagram showing another conventional power source switch circuit.

FIG. 4 is a block diagram of another conventional example. The components and parts corresponding to those in FIG. 3 shall bear the same reference numerals.

In FIG. 4, the difference from the conventional example in FIG. 3 is that the driving voltage Ss output from the first power source circuit 3 is fed not only to the microcomputer 9 but also to a detecting switch 11 so that the driving voltage Ss may be fed as a detecting signal Sk to the microcomputer 9 through the detecting switch 11. The other formations than this are the same as in the conventional example in FIG. 3.

In FIG. 4, the detecting switch 11 is an unlocked type switch which will be interlocked to be momentarily on and then off in case the main switch 2 is engaged. When this detecting switch 11 is switched on, the driving voltage Ss from the first power source circuit 3 will be led as a detecting signal Sk into the microcomputer 9 through the detecting switch 11. When the microcomputer 9 reads out this detecting signal Sk, the sub-switch 4 will be able to be controlled to be on.

Now, it shall be considered that the main switch 2 is engaged.

When the main switch 2 is engaged, the first power source circuit 3 will be first switched on and the driving voltage Ss will be fed to the microcomputer 9 and one end of the detecting switch 11. At the same time, the resetting signal Sr will be fed to the microcomputer 9 from the first power source circuit 3. The microcomputer 9 will be switched on by the driving voltage Ss and will be initially set by the resetting signal Sr. At the same time when the main switch 2 is engaged, the detecting switch 11 will be momentarily switched on and the driving voltage Ss fed to the detecting switch 11 will be led as a detecting signal Sk into the microcomputer 9 through the detecting switch 11.

When the microcomputer 9 receives the detecting signal Sk, the microcomputer 9 will enter a controlling operation of switching on the sub-switch 4 irrespective of the contents of the power source data stored in the memorizing apparatus 10, will output a high level signal as a controlling signal Sd and will feed it to the base of the transistor 7 through the resistance R1 to switch on the transistor 7.

When the transistor 7 is switched on, an electric power will be fed to the relay winding 4c of the sub-switch 4 from the output terminal of the first power source circuit 3 and the relay winding 4c will be excited. The contacts 4a and 4b will contact with each other, the commercial alternating current power source will be fed to the second power source 5 and the second power source circuit 5 will be switched on. When the second power source circuit 5 is switched on, the electric power will be fed to the respective circuits of the television set.

Next, it shall be considered that electricity is interrupted while the main switch 2 is engaged as it is and the sub-switch 4 is off (on stand-by) and is then restored and the commercial alternating current power source is again fed to the first power source circuit 3.

When the commercial alternating current power source is again fed to the first power source circuit 3 while the main switch 2 is engaged as it is, the first power source circuit 3 will be switched on and the driving voltage Ss will be fed to the microcomputer 9 and one end of the detecting switch 11. At the same time, the resetting signal Sr from the first power source circuit 3 will be fed to the microcomputer 9. The microcomputer 9 will be switched on by the driving voltage Ss and will be initially set by the resetting signal Sr. As the main switch 2 is not engaged now, the detecting switch 11 will not be switched on and the detecting signal Sk will not be fed to the microcomputer 9.

As the detecting signal Sk is not fed and the memorized data (off-data of the sub-switch 4) of the memorizing apparatus 10 are off, the initially set microcomputer 9 will not enter the operation of controlling switching on the sub-switch 4, will output a low level signal as a controlling signal Sd and will feed it to the base of the transistor 7 through the resistance R1. Therefore, the transistor 7 will not be switched on. As the transistor 7 is not switched on, the sub-switch 4 will remain switched off, the second power source circuit 5 will not be switched on and no electric power will be fed to the respective circuits of the television set. Thereby, the miss-operation after the electricity is restored can be prevented.

However, in order to meet the above mentioned operation, a very high mechanical precision will be required of the operation of the main switch 2 and detecting switch 11. Further, depending on the timing until the microcomputer 9 is started by the first power source circuit 3 and the timing of switching the detecting switch 11 on and then off, for example, when the main switch 2 is switched on and the driving voltage Ss is fed to the microcomputer 9 from the first power source circuit 3, in case the detecting switch 11 is already off at this time, the detecting signal Sk from the detecting switch 11 will not be fed to the microcomputer 9 and the above mentioned expected effect will not be able to be obtained.

Figure 5:
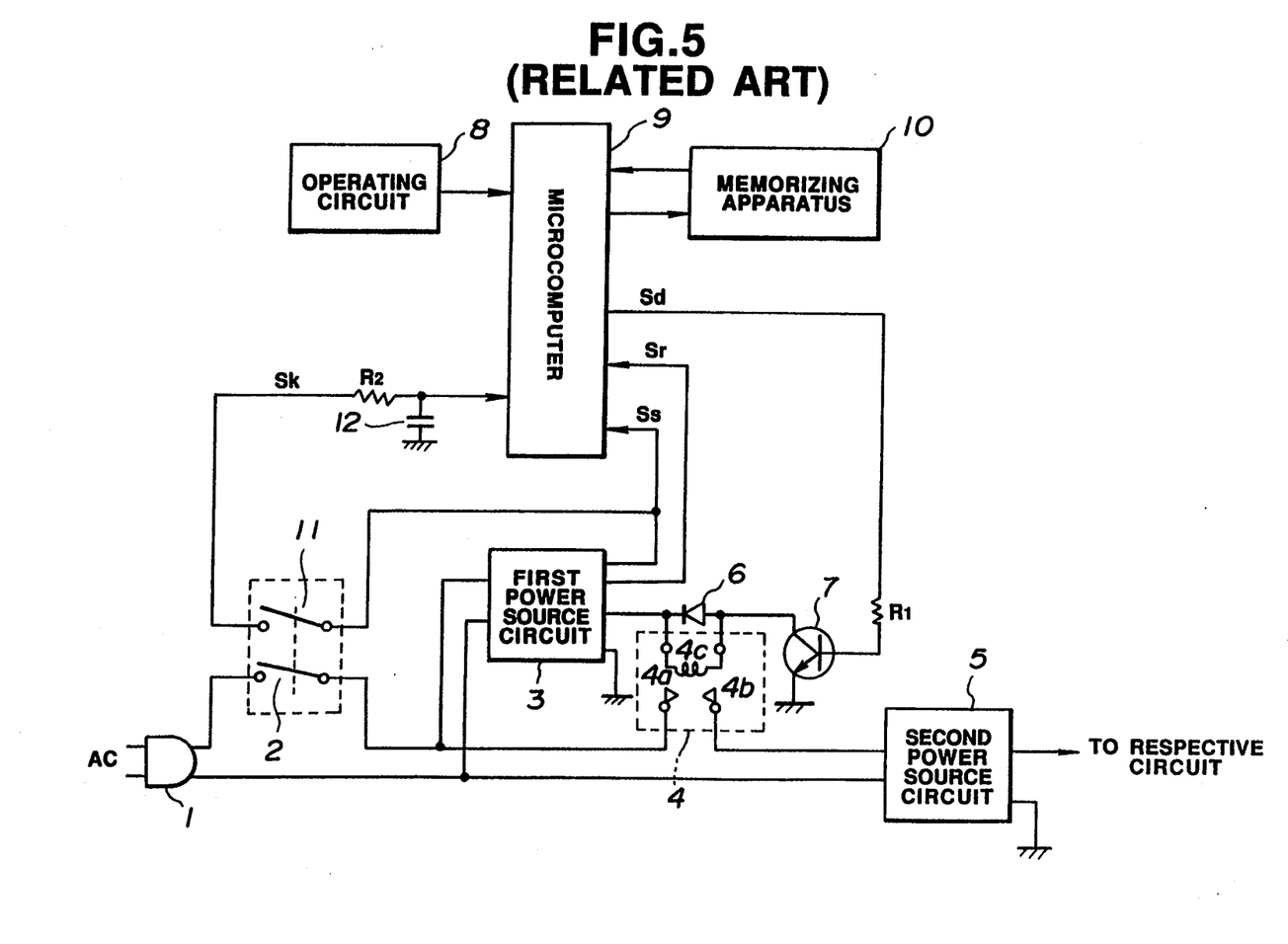
FIG. 5 is a block diagram showing another conventional power source switch circuit.

FIG. 5 is a block diagram showing another conventional example. The components and parts corresponding to those in FIG. 4 shall bear the same reference numerals.

In FIG. 5, the difference from the conventional example in FIG. 4 is that a time constant circuit comprising a resistance R2 and condenser 12 is inserted between the detecting switch 11 and microcomputer 9 so that the detecting signal Sk from the detecting switch 11 momentarily switched on may be held for a fixed time in the condenser 12. The other formations than this are the same as in the conventional example in FIG. 4.

Now, it shall be considered that the main switch 2 is engaged.

When the main switch 2 is engaged, the first power source circuit 3 will be first switched on and the driving voltage Ss will be fed to the microcomputer 2 and one end of the detecting switch 11. At the same time, a resetting signal Sr will be fed to the microcomputer 9 from the first power source circuit 3. The microcomputer 9 will be switched on by the driving voltage Ss and will be initially set by the resetting signal Sr. At the same time when the main switch 2 is engaged, the detecting switch 11 will be momentarily switched on, the driving voltage Ss fed to the detecting switch 11 will become a detecting signal Sk through the detecting switch 11 and the detecting signal Sk will be fed to the condenser 12 through the resistance R2.

Thereby, even in case the detecting switch 11 is switched off before the microcomputer 9 rises, the detecting signal Sk charged by the condenser 12 will be fed to the microcomputer 9, therefore, the same as in the conventional example in FIG. 4, the microcomputer 9 will operate to control switching on the sub-switch 4 and will be able to feed a predetermined electric power to the respective circuits of the television set from the second power source circuit 5.

However, in order to meet the above mentioned operation, yet a very high mechanical precision will be required of the operation of the main switch 2 and detecting switch 11. Further, depending on the timing until the microcomputer 9 is started by the first power source circuit 3 and the timing of switching the detecting switch 11 on and then off, for example, before the main switch 2 is switched on and the driving voltage Ss is output from the first power source circuit 3, if the detecting switch 11 is already switched off, the condenser 12 will not be charged by detected information and the above mentioned expected effect will not be able to be obtained.

As described above, in the conventional power source switch circuit in FIG. 3, there has been a disadvantage that, even if the main switch is engaged, as the sub-switch is controlled on the basis of the power source data (the last on/off state of the sub-switch) stored in the memorizing apparatus, depending on the contents of the power source data, the sub-switch will not be able to be positively switched on and the electric power will not be able to be fed to the respective circuits of the television set.

The other conventional examples than are shown in FIGS. 4 and 5 are considered to be adopted but to have respectively the above described defects and are not yet practiced.

SUMMARY OF THE INVENTION

An object of the present invention is to provide a power source switch circuit wherein, when a main switch is engaged, a sub-switch will be able to be positively switched on.

Another object of the present invention is to provide a power source switch circuit wherein, while a main switch is engaged as it is and a sub-switch is switched off (on stand-by), in case the electricity is interrupted and is then restored, the disadvantage that the sub-switch will be freely engaged after the electricity is restored will be able to be eliminated.

Also, another object of the present invention is to provide a power source switch circuit high in the operability.

The power source switch circuit according to the present invention comprises:

a main switch arranged on an electric power feeding line from an alternating current power source and switching on/off an electric power feed;

a first power source circuit generating a first direct current power source voltage when said main switch is switched on;

a sub-switch arranged on an electric power feeding line on the output side of said main switch and controlled to be switched on/off by a controlling signal;

a second power source circuit generating a second direct current power source voltage when said sub-switch is switched on;

a first electricity storing means for holding a voltage;

a second electricity storing means for holding the voltage from said first electricity storing means for a predetermined period;

a third switch arranged between said first electricity storing means and second electricity storing means, operating to be switched on as interlocked with the engagement of said main switch and feeding as a detecting signal the voltage held by said first electricity storing means to said second electricity storing means; and a controlling signal generating means operated by the first direct current power source voltage from said first power source circuit and generating said controlling signal for switching on said sub-switch in response to the detecting signal fed to said second electricity storing means.

According to the above mentioned formation, when the main switch is engaged, the voltage held in advance by the first electricity storing means will move momentarily to the second electricity storing means through the third switch and will be held. When this voltage held by the second electricity storing means is fed as a detecting signal to the controlling signal generating means, the controlling signal generating means will make a controlling operation and will positively switch on the sub-switch.

DETAILED DESCRIPTION OF THE PREFERRED EMBODIMENTS

Figure 1:
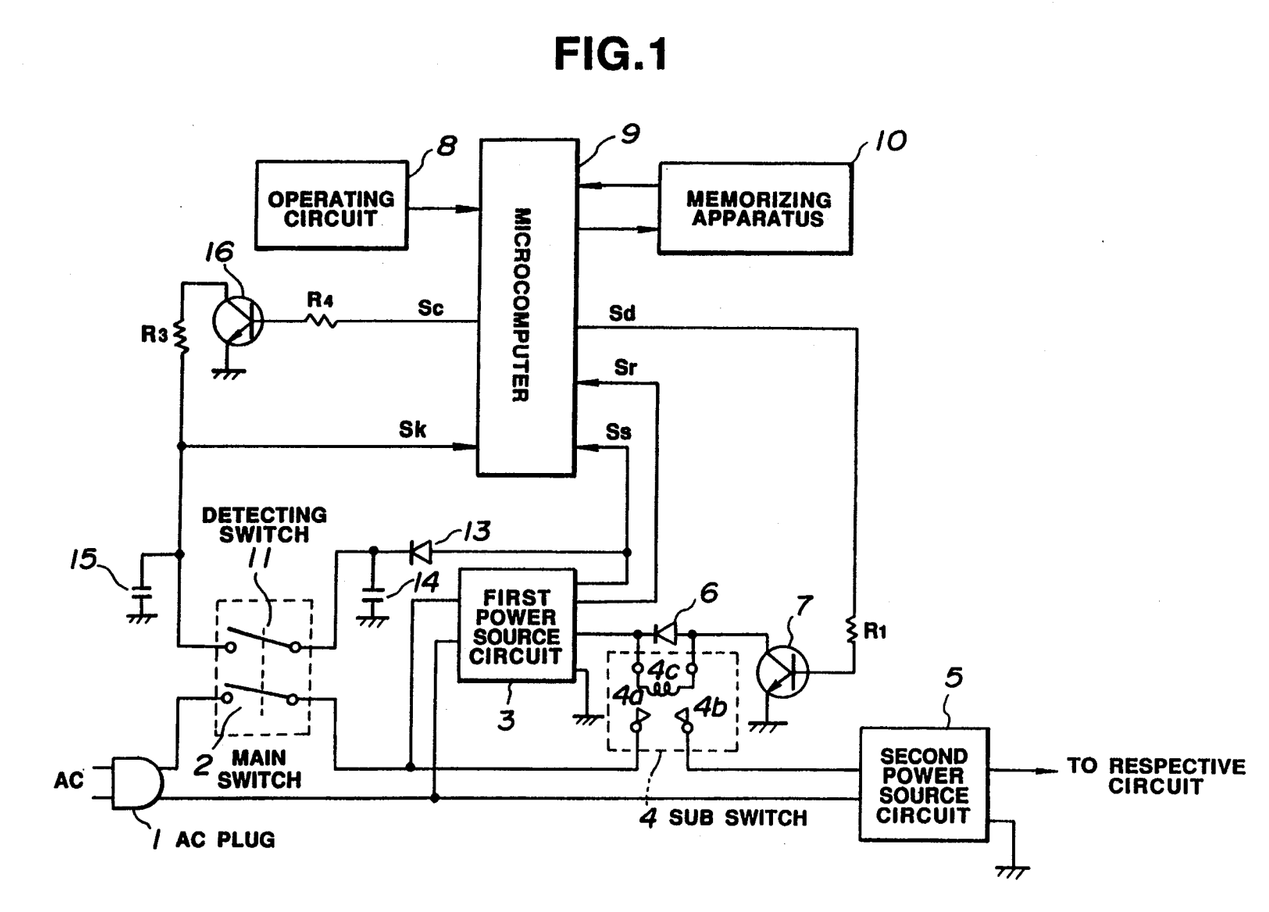
FIG. 1 is a block diagram showing one embodiment of a power source switch circuit according to the present invention.

FIG. 1 is a block diagram showing one embodiment of a power source switch circuit according to the present invention. The components and parts corresponding to those in FIG. 3 shall bear the same reference numerals.

In FIG. 1, a commercial alternating current power source (AC) not illustrated is fed to an AC plug 1. One input terminal of a first power source circuit 3 is connected to one power source line of the AC plug through a main switch 2. Further, one input terminal of a second power source circuit 5 is connected to said one power source line of the AC plug 1 through a main switch 2 and sub-switch 4. The other input terminal of the first power source circuit 3 and the other input terminal of the second power source circuit 5 are connected to the other power source line of the AC plug 1. One output terminal of the second power source circuit 5 is connected to a television signal circuit not illustrated and the other output terminal is connected to a reference potential point.

There are three output terminals in the first power source circuit 3. The first output voltage is fed as a driving voltage Ss to a microcomputer 9. The second output voltage is fed as a resetting signal Sr to the microcomputer 9. The third output voltage is fed to one end of a relay winding 4c of the sub-switch 4. The other end of the relay winding 4c is connected to the reference potential point through a collector-emitter path of a transistor 7. One end and the other end of the relay winding 4c are connected with each other through a surge absorbing diode 6. A relay controlling signal Sd from the microcomputer 9 is fed to the base of the transistor 7 through a resistance R1.

An operating circuit 8 for the user to switch on/off the power source of the television set with a remote control or the like or to operate the channels and a memorizing apparatus 10 provided with a non-volatile memory memorizing last channel positions, power source data or the like are connected to the microcomputer 9.

As described above, the present power source data of the sub-switch are stored in the memorizing apparatus 10 so that, in case the main switch 2 is once switched off and is then again switched on, these power source data will be read out of the memorizing apparatus 10 by the microcomputer 9 to reproduce the last switching on/off of the sub-switch 4. That is to say, if the sub-switch 4 is on last, the microcomputer 9 will output an on-signal as a controlling signal Sd but, if the sub-switch 4 is off last, the microcomputer 9 will operate to output an off-signal as a controlling signal Sd.

The difference from the conventional example in FIG. 3 is as follows. An unlocked type detecting switch 11 which will be momentarily switched on and then off as interlocked only when the main switch 2 is switched on is provided, a diode 13 is inserted between the first power source circuit 3 and detecting switch 11 and the cathode side of the diode 13 is connected to the reference potential point through a condenser 14. The diode 13 is to prevent the charge of the condenser 14 from being discharged to the side of the first power source circuit 3 and microcomputer 9. The other end of the detecting switch 11 is connected to the reference potential point through the condenser 15 and the other end of the above mentioned detecting switch 11 is connected to the microcomputer 9. That is to say, the charged voltage of the condenser 15 is fed as a detecting signal Sk to the microcomputer 9. Here, the condensers 14 and 15 form respectively a first and second electricity storing means and the microcomputer 9 forms a controlling signal generating means. Further, the other end of the above mentioned detecting switch 11 is passed through a resistance R3 and is connected to the reference potential point through a collector-emitter path of a transistor 16 and the base of the transistor 16 is connected to the microcomputer 9 through a resistance R4. A discharging controlling signal Sc is fed to the base of the transistor 16 from the microcomputer 9.

Now, it shall be considered that the main switch 2 is engaged.

When the main switch 2 is engaged, the commercial alternating current power source (AC) from the AC plug 1 will be fed to the first power source circuit 3 and the first power source circuit 3 will be switched on. At the same time, the driving voltage Ss from the first power source circuit 3 will be fed to the microcomputer 9 and, on the other hand, to the condenser 14 and one end of the detecting switch 11 through a diode 13. At this time, the condenser 14 will be charged with the driving voltage Ss. At the same time, the resetting signal Sr will be fed to the microcomputer 9 from the first power source circuit 3. As a result, the microcomputer 9 will be started by the driving voltage Ss and will be initially set by the resetting signal Sr.

When the main switch 2 is engaged, the detecting switch 11 will be interlocked with the main switch 2 and will be momentarily switched on and the electric charge stored in the condenser 14 will pass through the contact of the detecting switch 11 to become a detecting signal Sk which will he fed to charge the condenser 15. By the way, it is assumed that the condenser 14 is already charged. Here, when the microcomputer 9 rises, the detecting signal Sk stored in the condenser 15 will be led (received) into the microcomputer 9. When the microcomputer 9 receives the detecting signal Sk, it will output a high level signal as a controlling signal Sd and will feed it to the base of the transistor 7 through the resistance R1 and thereby the transistor 7 will be switched on.

When the transistor 7 is switched on, an electric power will be fed to the relay winding 4c of the sub-switch 4 from the output terminal of the first power source circuit 3 and the relay winding 4c will be excited. Then, the contacts 4a and 4b of the sub-switch 4 will contact with each other and the commercial alternating current power source from the main switch 2 will be fed to the second power source circuit 5. Thereby, the second power source circuit 5 will feed a predetermined power source voltage to the respective circuits of the television set.

When the microcomputer 9 receives the detecting signal Sk from the condenser 15, the discharging controlling signal Sc will be fed to the base of the transistor 16 through the resistance R4 and the transistor 16 will be switched on for a predetermined time. As the transistor 16 is switched on, the electric charge having remained in the condenser 15 when led out of the condenser 15 to the microcomputer 9 as a detecting signal Sk will be discharged to the reference potential point through the collector-emitter path of the transistor 16 through the resistance R3.

After the main switch 2 is engaged, the detecting switch 11 interlocked with the main switch 2 will be momentarily switched on and then off. While this detecting switch 11 is switched off, there will be no load in the condenser 14, the condenser 14 will be charged through the diode 13 with the driving voltage Ss from the first power source circuit 3 until the main switch 2 is switched off and the charge will be held until the main switch 2 is engaged next time after the main switch 2 is switched off.

Now, it shall be considered that, while the main switch 2 is engaged as it is and the sub-switch 4 is switched off (on stand-by), if the electricity is interrupted and is then restored and the commercial alternating current source is again fed.

While the main switch 2 is engaged as it is, if the commercial alternating current power source is again fed to the first power source circuit 3, the commercial alternating current power source from the AC plug 1 will be fed to the first power source circuit 3 through the main switch 2 and the first power source circuit 3 will be switched on. When the first power source circuit 3 is switched on, the driving voltage Ss and resetting signal Sr will be output from the first power source circuit 3, the driving voltage Ss will be fed to the microcomputer 9 and to the condenser 14 and one end of the detecting switch 11 through the diode 13, the condenser 14 will be charged here and the resetting signal Sr will be fed to the microcomputer 9.

As the main switch 2 is not engaged, the detecting switch 11 will remain off and the electric charge stored in the condenser 14 will not move.

The microcomputer 9 will be started when the driving voltage Ss is fed and will be initially set when the resetting signal Sr is fed. As there is no detecting signal Sk from the detecting switch 11, the microcomputer 9 will not enter the on-controlling operation of the sub-switch 4, will output a low level signal for a controlling signal Sd and will feed it to the base of the transistor 7 through the resistance R1. Therefore, the transistor 7 will not be switched on. As the transistor 7 is not switched on, the sub-switch 4 will remain off, the second power source circuit 5 will not be switched on and will therefore remain on stand-by and no predetermined electric power will be fed to the respective circuits of the television set not illustrated.

According to this embodiment, when the main switch 2 is engaged and the detecting switch 11 is momentarily switched on as interlocked with it, the charge stored in the condenser 14 will be moved to be held in the condenser 15 and therefore, even in case the detecting switch 11 is switched off before the first power source circuit 3 rises, the charge stored in the condenser 15 will be made the detecting signal Sk, then the first power source circuit 3 will rise, thereby the microcomputer 9 will rise, the charge stored in the condenser 15 will be able to be led into the microcomputer 9 as a detecting signal Sk and the sub-switch 4 will be able to be positively switched on.

As the detecting switch 11 which will be momentarily switched on as interlocked when the main switch 2 is engaged is provided, while only the main switch 2 is engaged (on stand-by), when the electricity is interrupted and is then restored, the television circuit will be able to be positively prevented from being freely switched on.

By the way, in the above mentioned embodiment, the power source for charging the condenser 14 is made the driving voltage Ss output from the first power source circuit 3 but is not limited to this and may be the output from the second power source circuit 5. The storage device 14 can be a battery.

Figure 2:
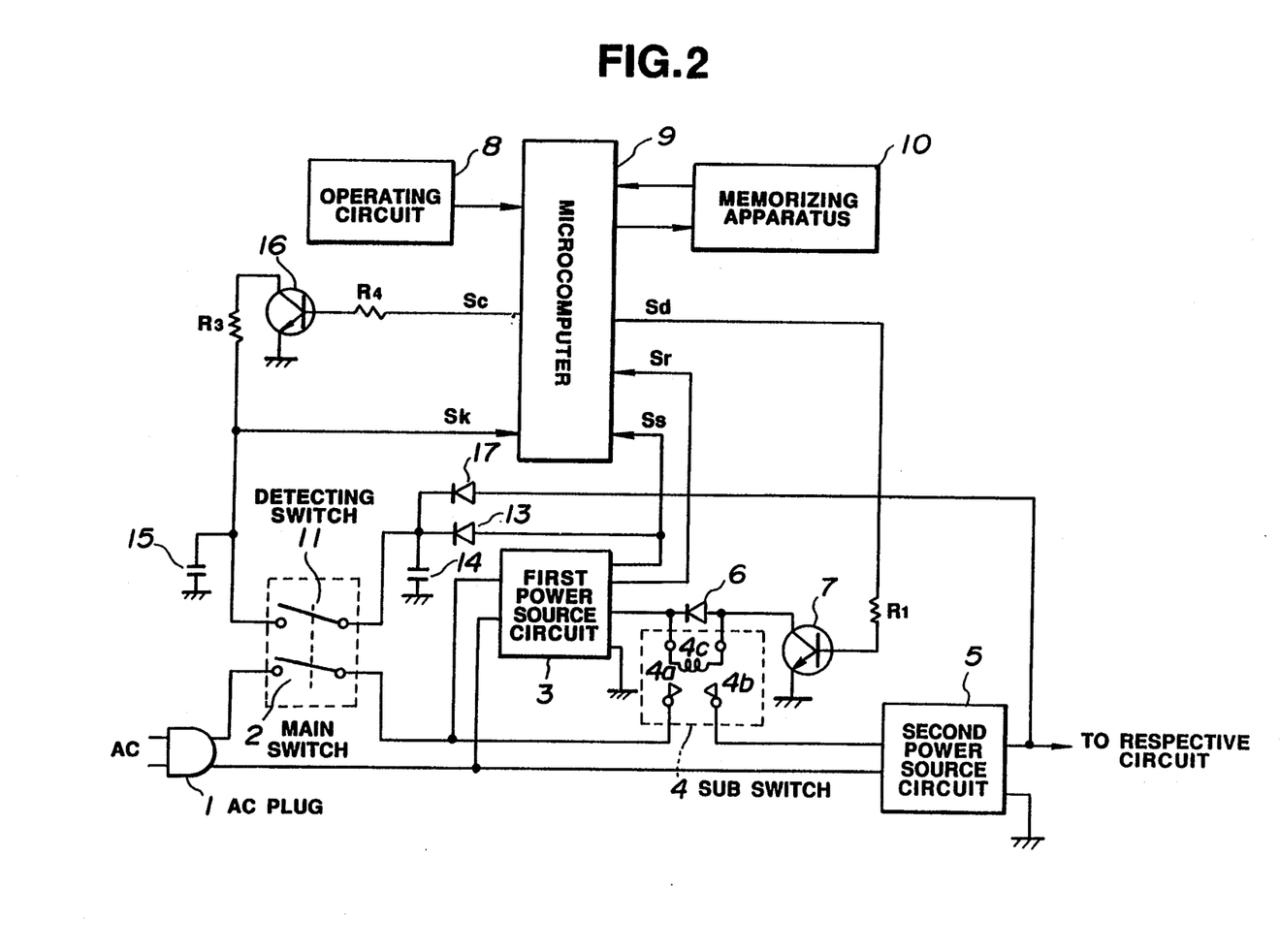
FIG. 2 is a block diagram showing another embodiment of a power source switch circuit according to the present invention.

FIG. 2 is a block diagram showing another embodiment of a power source switch circuit according to the present invention.

In the embodiment in FIG. 2, the power source for charging the condenser 14 is obtained from the output of either of the output voltage Ss of the first power source circuit 3 and the output voltage of the second power source circuit 5. That is to say, in the circuit in FIG. 2, the output end of the power source voltage of the second power source circuit 5 is connected to the output end of the condenser 14 through the diode 17. The other formations are the same as in FIG. 1.

In such formation, the driving voltage Ss from the first power source circuit 3 is used for driving the microcomputer 9 and is therefore, for example, 5 V. However, if an output voltage of 9 to 12 V. of the circuit voltage output from the second power source circuit 5 is fed to the output end of the condenser 14 through the diode 17, when the main switch 2 is on but the sub-switch 4 is off (on stand-by), the driving voltage Ss from the first power source circuit 3 will be fed as a charging voltage to the condenser 14 and, when the main switch 2 and sub-switch 4 are both on (operating the television signal circuit), the output voltage (a little higher than the above mentioned driving voltage Ss) from the second power source circuit 5 will be fed as a charging voltage to the condenser 14. Thereby, when the television signal circuit is being operated, the charge quantity to the condenser 14 will be able to be increased as compared with that on stand-by. Therefore, even in case the main switch 2 is then switched off, the charge state of the condenser 14 will be able to be maintained longer.

By the way, in the embodiment in FIG. 1, the condenser 14 forming an electricity storing means need not always to be a condenser but may be a primary battery or chargeable secondary battery. In such case, instead of the condenser 14, the battery will be connected and the charging path by the diode 13 may be deleted.

By the way, in the embodiments in FIGS. 1 and 2, the transistor 16 for discharging the remaining charge in the condenser 15 is controlled by the microcomputer 9 forming a controlling signal generating means but is not limited to be controlled by the microcomputer 9 and may be controlled, for example, by a separately provided discharge controlling means switching on the discharging transistor 16 with a little delay time after the microcomputer 9 is driven. Means for discharging the charge of the condenser 15 may be formed of a natural discharging circuit by only a passive device (such as a resistance) instead of the discharging transistor 16.

By the way, in the above mentioned embodiments, the input impedance of inputting the detecting signal Sk to the microcomputer 9 is assumed to be infinite and the detecting signal Sk from the condenser 15 is led directly into the microcomputer 9. However, in case the input impedance of the microcomputer 9 is low, an impedance converting means may be arranged between the condenser 15 and microcomputer 9 and the detecting signal Sk from the condenser 15 may be fed to the microcomputer 9 through this impedance converting means.

As described above, according to the present invention, there is an effect that, in case the main switch is engaged, the sub-switch will be able to be positively switched on. While the main switch is engaged as it is and the sub-switch is switched off (on stand-by), in case the electricity is interrupted and is then restored, the disadvantage that, after the electricity is restored, the sub-switch will be freely engaged will be able to be eliminated. Therefore, a power source switch circuit high in the operability by the user can be provided.

By the way, the present invention is not limited to only the above mentioned embodiments but can he variously modified without deviating from the subject matter of the invention.

What is claimed is:

1. A power source switch circuit characterized by comprising:
   a main switch arranged on an electric power feeding line from an alternating current power source and switching on/off an electric power feed;
   a first power source circuit generating a first direct current power source voltage when said main switch is switched on;
   a sub-switch arranged on an electric power feeding line on the output side of said main switch and controlled to be switched on/off by a controlling signal;
   a second power source circuit generating a second direct current power source voltage when said sub-switch is switched on;
   a first electricity storing means for holding a voltage;
   a second electricity storing means for holding the voltage from said first electricity storing means for a predetermined period;
   a third switch arranged between said first electricity storing means and second electricity storing means, operating to be switched on as interlocked with the engagement of said main switch and feeding as a detecting signal the voltage held by said first electricity storing means to said second electricity storing means; and a controlling signal generating means operated by the first direct current power source voltage from said first power source circuit and generating said controlling signal for switching on said sub-switch in response to the detecting signal fed to said second electricity storing means.

2. A power source switch circuit according to claim 1 characterized in that said first electricity storing means holds the power source voltage fed from said first power source circuit or second power source circuit.

3. A power source switch circuit according to claim 1 characterized in that said first electricity storing means is formed of a battery.

4. A power source switch circuit according to claim 1 characterized in that said second electricity storing means is provided with a charged voltage discharging means.

5. A power source switch circuit according to claim 4 characterized in that said charged voltage discharging means is formed of a transistor wherein the collector-emitter path is parallelly connected to said second electricity storing means and a discharging controlling signal is fed to the base.

6. A power source switch circuit according to claim 4 characterized in that said charged voltage discharging means is formed of a natural discharging circuit by a passive device.

7. A power source switch circuit according to claim 1 characterized in that an impedance converting means is arranged in a feeding path feeding as a detecting signal the voltage held in said second electricity storing means to said controlling signal generating means.

* * * * *